Figure 1:
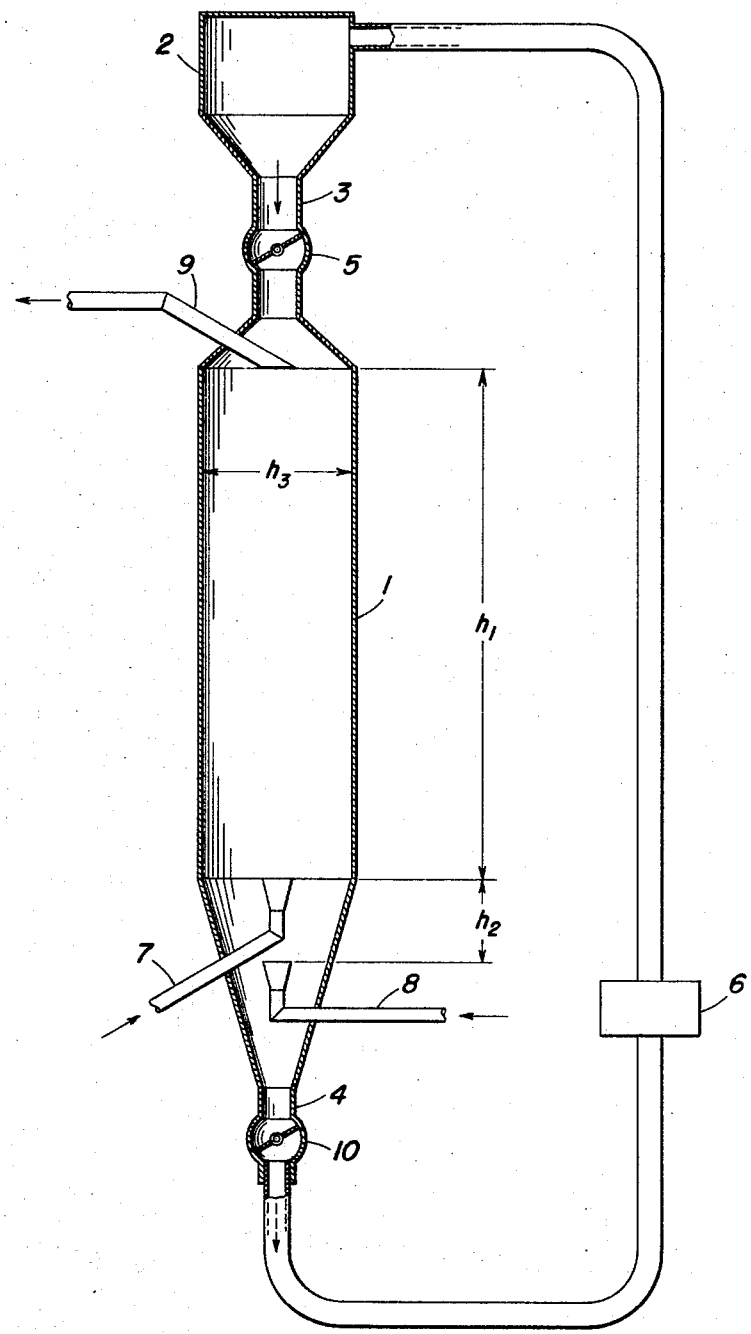

Fig. I.

Sept. 27, 1966            E. L. CLARK            3,275,405
PROCESS FOR THE TREATMENT OF SOLIDS AT HIGH TEMPERATURES
Filed Oct. 16, 1962            2 Sheets-Sheet 2

INVENTOR
Ezekail L. Clark
BY
Charles J. Elderkin
ATTORNEY

United States Patent Office 3,275,405
Patented Sept. 27, 1966

3,275,405
PROCESS FOR THE TREATMENT OF SOLIDS AT
HIGH TEMPERATURES
Ezekail L. Clark, Pittsburgh, Pa., assignor to The North
American Coal Corporation, Cleveland, Ohio, a corporation of Ohio
Filed Oct. 16, 1962, Ser. No. 230,838
9 Claims. (Cl. 23—142)

This invention relates generally to the treatment of solids at high temperatures, and more particularly it relates to the carrying out of chemical reactions between solids and gases at elevated temperatures under conditions controlled to avoid the contamination and dilution of both solid and gaseous products by combustion gases and the like. The invention finds application in the chemical and metallurgical treatment of a wide variety of materials, a typical example being the decomposition of metallic sulfates.

The processing of solid particles in a controlled atmosphere at high temperatures has always been a difficult industrial problem, especially where appreciable quantities of heat must be added. The two oldest and still most useful types of equipment for heating solids to a high temperature, the shaft furnace and the rotary kiln, have been developed to a high degree of efficiency in modern plant usage. The blast furnace and cement or lime kilns are present examples of the use of these processing units on a tremendous scale. However, these depend on combustion of fuel within the unit and direct contact of the products of combustion or flue gases with the solid being heated and admixture of these flue gases with any gaseous product of the heating process. Some variation in the atmosphere is possible as in the blast furnace a reducing environment is maintained while in most lime or cement furnaces an oxidizing atmosphere is achieved.

In processes where it is desired to avoid contamination of the solid or gaseous products by flue gases, many techniques have been attempted. The simplest of these is the interposition of a gas-tight, heat-conductive barrier between the materials under process and the hot liquid or gaseous medium supplying the heat energy. The indirect-fired rotary kiln is an example of such a technique where the combustion takes place outside of a rotating metal cylinder containing the solid being processed. The metal body of the kiln is usually of high-alloy steel to withstand the high temperatures of the combustion zone which surrounds it. Heat transfer takes place by direct contact of the solid being heated with the hot metal wall. The rate of heat transfer is low in spite of the turbulence induced by rotation of the cylinder and lifting and agitation of the solid by flights or shelves in the metal wall. Furthermore, the metal wall has a limited life and is very costly to replace. Such units are not adaptable to large scale processing of low value commodities. Their use is limited to the relatively small-scale production of costly inorganic pigments and special compounds.

The discovery and application of the fluidization of solid particles appeared to be a panacea for treating of solids. One of the problems mentioned above, the low heat conductivity of beds of solid particles, was eliminated since fluidization and the maintenance of solids in a dense-phase fluidized bed provided much higher heat transfer rates than a fixed un-agitated or even a mechanically mixed bed of the same solids. However, the problem of the need of a barrier between combustion gases and the solids being processed was not eliminated. A new difficulty was introduced in that the temperature of the fluidized bed was essentially constant and countercurrent heat transfer with its attendant economies could not be achieved in a single unit. A multiplicity of fluidized beds was necessary to approach countercurrent operation. The condition and size of the solid being fluidized required some control to avoid disruption of the fluidization. If the solid being treated changes radically in size or surface characteristics, the conditions for proper fluidization are also altered and difficulties are encountered in operations.

It is obvious that the solid particles could be efficiently heated by bringing them in turbulent contact with a hot gas which would impart its sensible heat content to the cooler particle. Such a procedure would permit utilizing any gaseous atmosphere desired, provided the gases were not decomposed or chemically changed by the high temperatures needed. Brief consideration of the quantities of gas involved in supplying any appreciable amount of heat to the solid would indicate the difficulty of such a procedure. For example, assume that the solid being treated is a metallic sulfate decomposing at 1500° F. with an endothermic heat of decomposition of 1000 B.t.u./lb., and the gas atmosphere desired is sulfur dioxide. If the sulfur dioxide is heated to 2000° F., which is probably the maximum temperature possible in normal alloy-steel equipment, each pound of gas would supply only 100 B.t.u. in cooling fromp 2000° F. to 1500° F. (Specific heat of sulfur dioxide is 0.2 B.t.u./lb./° F. at 1500 to 2000° F.) It would be necessary to heat and circulate 10 pounds of sulfur dioxide per pound of metal sulfate to provide the decomposition heat energy. This amounts to almost 60 standard cubic feet per pound of solid. The problems of circulating hot gas, heating it to high temperatures and maintaining a porous solid bed to permit gas passage at a low pressure drop would result in a very costly operation.

The teachings of previous investigators have suggested the possibility of using an inert solid as a means of transferring the required heat to the solid particles being reacted. Puening, in U.S. Patent No. 1,698,385, teaches the use of heated metal balls for providing heat for carbonizing coal on a moving belt or conveyor. Koppers, U.S. Patents Nos. 1,712,082 and 1,712,083, feed heated balls to a rotary retort for carbonizing or drying coal. Lucke, U.S. Patent No. 1,977,084, uses ceramic pebbles to supply heat for gasifying coal by heating the pebbles and mixing the hot pebbles in a shaft furnace into which steam is injected. The use of a moving bed of pebbles heated in one chamber by the combustion of fuel or flue gases from such a combustion in an external chamber, passing through a narrow throat section to a second chamber to impart heat to another gas, has been highly developed. The first such unit was disclosed by Olsson in 1915, U.S. Patent No. 1,148,331, with many improvements in mechanical and control details since that time. The system for conveying heat to particulate solids by means of heated solid heat transfer bodies have all involved co-current flow while those systems for heating fluids have used counter-current flow wtih greatly improved heat transfer.

More recently, Stokes et al., U.S. 3,007,774 disclose the use of ceramic pebbles for both dehydrating and decomposing molten aluminum sulfate. The patentees propose that the melt be sprayed on a bed of 1½ to 2-inch hot ceramic pebbles heated in a separate heating chamber to about 1100° C., thus supplying the heat necessary for both dehydrating the aluminum sulfate and decomposing the sulfate to oxide. While this disclosure introduces the idea of using heated ceramic pebbles to both dehydrate and decompose aluminum sulfate, it still provides for a downward flow of both pebbles and molten aluminum sulfate with co-current heat transfer. It further introduces the problem of crust formation and plugging inherent in the use of a molten material. Furthermore, the introduction of water vapor obtained during the dehydration portion of the combined process is a serious contaminant and interferes seriously with the recovery of the valuable oxides of sulfur produced during the decomposition.

In the present invention, I propose to use counter-current flow for the heating of particulate solids with solid heat transfer particles or bodies supplying heat to the solid reactants. The system I propose involves a fluent bed of metal or ceramic, inert, heat-resistant particles moving downward through an insulated chamber with the solid particles to be heated or reacted moving upwards entrained in a gaseous stream, the composition of which may be regulated to provide the desired atmosphere for the heating or reaction of the entrained solids. It should be realized that in such a system maximum control of the heat transfer rate may be achieved. The use of counter-current flow permits maximum, efficient utilization of the heat energy introduced by the heat transfer solids. Since the heat transfer solids may be heated by either direct combustion of fuel within a separate solids-heater, flue gases from such a combustion in a separate combustion chamber communicating with the solids-heater or hot gases from some co-current processing operation, contamination of the reactants and gases within the reacting or heating chamber is avoided. Since in all heat transfer processes heating of the heat transfer particles, heating of solids being reacted, or any recovery of residual heat in the heat transfer particles, is performed by direct contact, no metal walls or high-temperature, expensive alloy steel heat transfer surfaces are needed. The conveyance of the solids being reacted in a gaseous stream eliminates any concern about effects of changes in particle size or shape due to heating or chemical reaction, as might be involved in fluidized operation, as the gas transport conditions can be easily chosen to handle the extremes to be encountered within the process.

It must be realized that the proper operation of this technique is entirely dependent on proper selection of gas and solid velocities. For example, it is well known that a downward-flowing mass of solids may be utilized to remove undesired solid contaminants from a gaseous stream flowing upward through such a mass. As will be shown by results of experiments with such a system at elevated temperatures and wherein an endothermic chemical reaction takes place, control of the variables governs the areas within which operation is possible at highest efficiency. While the system proposed may be utilized for heating or heat-treating solid particles in a controlled atmosphere free from combustion gases, its greatest advantage resides in its use for endothermic reactions of solids at elevated temperatures.

Figure 2:
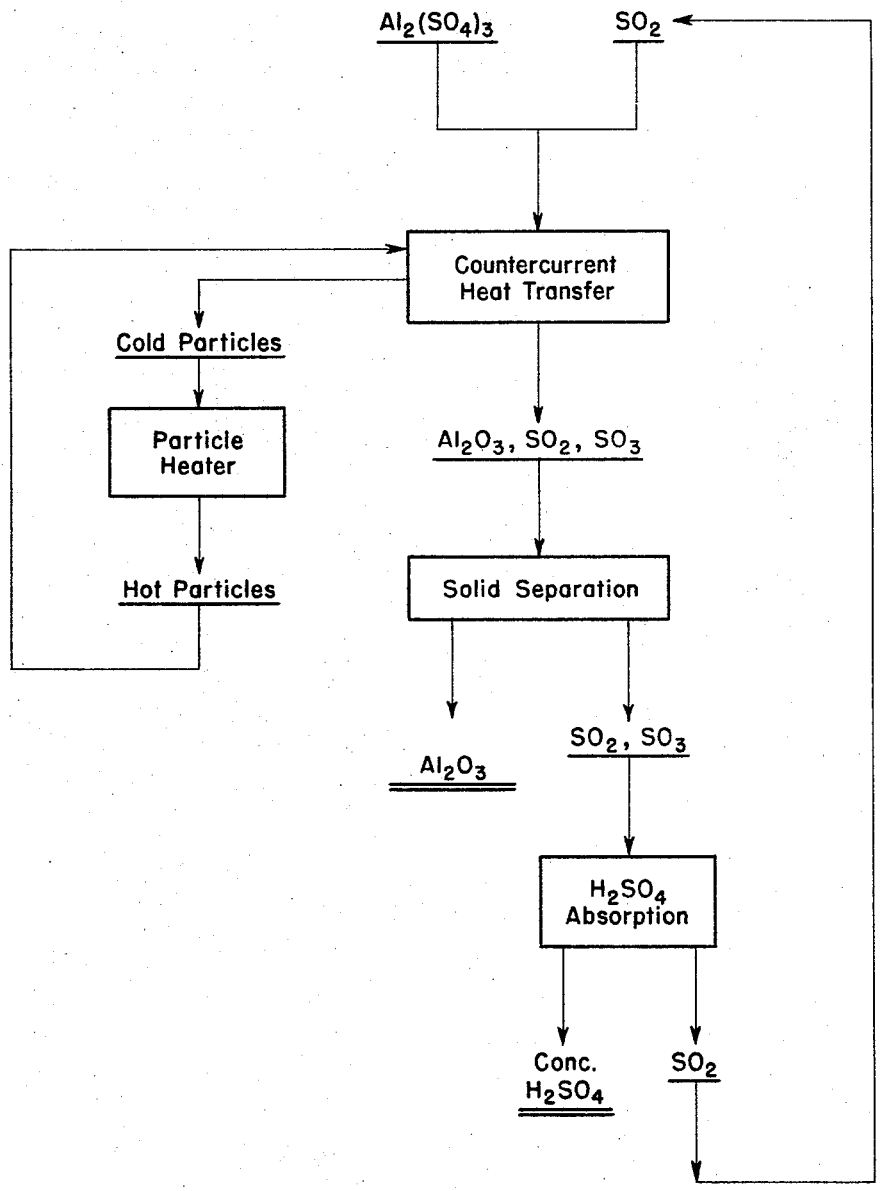

It is believed that a more complete understanding of both the principles of operation of my invention as well as the application of the process steps involved will be gained by referring to the following detailed description thereof taken in conjunction with the accompanying drawings and in which:

FIGURE 1 is a sectional side view of one embodiment of a reactor and accompanying auxiliary equipment designed in accordance with my invention; and FIGURE 2 is a flow sheet or flow diagram illustrating the application of the present invention to the decomposition of aluminum sulfate.

With reference to FIGURE 1, the reactor generally is indicated at 1, and comprises a refractory-lined vessel which, during operation, would appear substantially filled with a mass of downward-flowing heat transfer particles. The heat transfer particles are supplied from a particle heater 2, also refractory-lined, in which the particles are heated by direct contact with hot combustion gases and/or other sources of heat derived from allied process operations. Of course, the heating must be controlled so as not to coat or contaminate the heat transfer particles with some substance which would, in turn, contaminate the reactants within the reactor. The heated particles in the heater 2 either flow into the reactor 1 by gravity or, alternatively, are metered into the reactor 1 by a rotary valve 5 which is located within a connecting section 3 (as shown). The connecting section 3 is of a sufficiently small diameter and of sufficient length so as to act as a seal between the reactor 1 and the heater 2, thereby preventing the mixing of gases in one vessel with those in the other. Once in the reactor, the downward-flowing heat transfer particles give up their sensible heat to the upward-flowing reactant gases, as described hereinbelow, and fall into throat 4 at the bottom of the reactor. A rotary valve 10 is utilized at this point for insuring flow of particles through the reactor and egress of particles from the reactor at a constant rate. Control of particle flow at valve 10 is more desirable then using valve 5, as the latter is located at the high-temperature end, whereas the former operates at more moderate temperatures. A suitable conveying system, indicated generally at 6, is then employed to return the particles to the particle heater 2.

The solid to be treated or reacted is introduced through the pipe 7, transported by a carrier gas of the composition required by the desired reaction system. The inlet tube is preferably sloped in an upward direction and the mixture of gas and solid introduced so as to give to the solid an upward momentum comparable to the speed of gas and solid flow within the entire reactor. Additional gas of suitable composition may be introduced through the auxiliary line 8, below the introduction point of the solid-gas mixture (7). The solid being treated or reacted passes upward through the interstices of the downward-flowing bed of heat-transfer particles, being heated by the particles, said heat being absorbed by the solid under treatment either as sensible heat to raise its temperature or as reaction heat to supply the requirements of an endothermic chemical process. The mixture of gases and solid products exit at the top of the reactor through exit-pipe 9 and may be further treated or separated as needed.

The critical dimensions for the reactor are also indicated in FIGURE 1. The diameter of the reactor, $h_3$, determines the gas velocity for any predetermined quantity of gas plus solid being fed. This dimension must be selected to provide the proper carrying or transport velocity for the solid being reacted with due regard for the orderly downward movement of the heat-transfer particles. The height $h_1$, determines the reaction time to which the solid is subjected, since once the mixture velocity is defined by dimension, $h_3$, the distance of travel, $h_1$, will fix the time within the reactor. The distance $h_2$, between the two entrance points is required to take care of any reacting solids which achieve random motions through collision with heat-transfer particles and prevent reactant loss through such motion. The lower position of the second gas inlet provides a zone wherein the solid reactants may be given an upward velocity. This zone may be reduced in cross-sectional area (as shown) to increase the gas velocity and its accelerating effect on reactant solids.

The various flow rates of gas, reactant solid and heat-transfer solid are dependent on the material being treated, the reaction requirements and the particle sizes involved. However, certain basic limitations are necessary to ensure efficient operation. At all times, the upward flow rate of gas and reactant solid must be below the point of incipient fluidization of the heat-transfer particles. This velocity has been termed the "critical velocity" by those working in the art of fluidized operation. If this velocity is exceeded, the flow of heat-transfer particles becomes disordered and mixing takes place within the bed of these particles preventing counter-current heat transfer and decreasing efficiency. This limiting flow rate sets the upper limit of the particle size of the reactant particle since its velocity must be well above the entire fluidization range for efficient transport through the downward-flowing heat-transfer particles. As an example of this size interrelation, reactant particles as large as 14 mesh (equivalent to 3/64 inch) have been efficiently reacted in such a system in a downward-flowing heat-transfer mass of particles 1/4 inch (equivalent to 16/64 inch) in diameter, with almost complete recovery of reactant. Thus, it may be seen that a reactant particle of as much as 1/5 the diameter of the heat transfer particle may be suitably treated without diminishing heat transfer efficiency or incurring any appreciable loss of reactant. During this operation the gas flow was maintained approximately 5% below the critical velocity for the heat-transfer particles. Gaseous reaction products were included in evaluating the approach to critical velocity. The specific gravity of both reactant solids and heat-transfer solids were approximately equal.

The downward flow rate of heat-transfer solids did not affect flow of reactant solid over a considerable range. Varying the downward flow of heat-transfer solids from 3420 to 6300 lbs./sq. ft. (of reactor cross section)/hour did not affect flow of reactant solid. Obviously, the greater flow of heat-transfer solid introduced a larger quantity of heat into the system. Similarly, at proper gas velocity the flow of reactant solids was varied from 195 to 630 lbs./sq. ft./hour with no appreciable change in recovery of reactant solids. Again, it must be understood that the higher flow rates of reactant solid required a higher input of heat energy so that the higher input rate of reactant solids was at the higher flow rate of heat-transfer solids. The maintenance of the gas flow at a point within the range of 20 to 5% below the critical velocity of the heat-transfer particles permitted operation over a wide range of downward-flow rate of the heat-transfer particles and a wide variation of input of reactant particles. Reactant particles as large as 1/5 the diameter of the heat-transfer particles were efficiently treated and recovered.

The actual size of the heat transfer particles, as well as the size ratio of reactant particles and heat transfer particles was found to be of importance. Since the heat contained within the heat transfer particle must travel through the particle to the surface before it can be transferred to the reactant, a smaller heat transfer particle will give up its heat content more quickly than a larger particle. This heat flow within such a particle becomes more critical when ceramic or other low-heat-conducting materials are used. There is an economic balance involved due to the limiting ratio between reactant and heat transfer particles as described in the preceding paragraph. A very small heat transfer particle would so limit the allowable size of the reactant particle that excessive costs would be incurred in grinding or other size-reduction methods used in preparation of feed reactants. Similarly, the separation and recovery of product would be difficult and costly for a very small reactant particle. It was found that a heat transfer particle of 1/4 inch to 3/4 inch in diameter was a particularly advantageous size range for ceramic particles which permitted rapid heating and cooling and allowed the use of a reasonably coarse reactant particle.

It was found that increasing the distance $h_2$ between the solids inlet and lower gas inlet was beneficial to the recovery of reactant solids. When $h_2$ was 3 to 6 times the diameter of the reactor vessel at the inlet points, essentially no solid reactant was carried downward by the heat-transfer particles. It should be noted that decreasing the cross-sectional area of this portion of the reactor, that is, at the inlet points, reduces the require length $h_2$ and thus decreases total reactor length.

While the process and apparatus of my invention has particular application to the decomposition of metallic sulfates, as described hereinafter, it is not limited thereto and can, for example, be successfully applied to the decomposition of metallic salts generally in a steam or hydrogen atmosphere, to heat treatment of metals or metal oxides with controlled atmospheres such as nitriding or reducing gas treatments, as well as other reactions of an organic or inorganic nature wherein it is essential to obtain gaseous products from solid reactants undiluted by combustion gases.

As noted heretofore, the decomposition of metal sulfates is best accomplished in an atmosphere of sulfur dioxide. The presence of sulfur dioxide in excess tends to cause the reaction, $$SO_3 \rightleftharpoons SO_2 + \tfrac{1}{2} O_2 \qquad (1)$$

to proceed towards the formation of sulfur trioxide which may be directly absorbed in sulfuric acid to form more concentrated acid. If sulfur dioxide is the main gaseous product of the decomposition of a metal sulfate, it would be necessary to pass the gaseous products through a catalytic process to convert the sulfur dioxide to sulfur trioxide and sulfuric acid. This additional processing requires a major investment in plant equipment and excessive operating costs.

The need for high temperature and high heat input for the endothermic decomposition as well as the special atmosphere (undiluted by combustion products or flue gases) results in the advantageous use of my process for high-temperature treatment of solids as heretofore described. A flow sheet for such a decomposition is shown in FIGURE 2.

Thus, the metal sulfate to be decomposed is entrained in a gaseous stream of sulfur dioxide. The combined solid-gas mixture is passed upwards through a countercurrent, fluent mass of heat-transfer particles. These particles, having been heated in a separate chamber to a temperature appreciably higher than that needed to decompose the sulfate being treated, supply heat energy for the endothermic decomposition of the sulfate.

In the case of sulfates, the ratio of gaseous conveying stream (the sulfur dioxide) to the sulfate being processed is so adjusted that the partial pressure of sulfur dioxide satisfies that equilibrium constant of Equation 1 at the temperature of operation, the required temperature being that necessary to decompose the sulfate being reacted.

Aluminum sulfate, $(Al_2(SO_4)_3)$, for example, may be decomposed at 1470–1600° F., or higher. At 1470° F., the weight of sulfur dioxide should be at least three times that of the sulfur trioxide which might be produced. Thus, in the production of 8330 lbs. of alumina from 28,000 lbs. of aluminum sulfate, 19,670 lbs. of sulfur trioxide is also produced. A minimum of 47,750 lbs. of sulfur dioxide and oxygen must be recycled, per hour or used as the carrier gas for the aluminum sulfate to satisfy equilibrium requirements. At the higher temperature of 1600° F., the carrier gas quantity must be increased to 80,750 lbs./hour.

The particle size of the aluminum sulfate being decomposed is preferably less than that passing through a 14-mesh sieve to permit entrainment by the carrier gas without also disrupting the movement of the fluent mass of heat transfer particles which may be 1/4 inch in diameter for the case described.

The products of decomposition leaving the reactor are passed through solids removal devices, without cooling, to remove the solid product (alumina in the above case). The gaseous reaction products ($SO_3$ and $SO_2$) are cooled to a temperature at which the sulfur trioxide may be absorbed in sulfuric acid in a standard absorption unit similar to those used in a sulfuric acid production plant. The remaining gases leaving the absorber are recycled to the reaction system to be used as carrier gas for aluminum sulfate and maintain equilibrium conditions for production of sulfur trioxide.

The equilibrium considerations mentioned in the previous paragraphs are affected by the presence of any diluent such as nitrogen, flue gases or water vapor. As a result, it was found beneficial to exclude, as much as possible, any contaminant gases. Water vapor was found to be especially harmful since, in addition to acting as a diluent and affecting the decomposition equilibrium, water vapor reacted with sulfur trioxide on cooling forming a stable mist of sulfuric acid which interfered with absorption of sulfur trioxide.

As a further improvement the hot gases leaving the solids removal step may be utilized to supply heat energy to the process. An obvious possibility is to utilize the heat energy for steam production which steam might be used for turbines driving the gas circulation compressors. Another possibility is to utilize heat exchangers to preheat the carrier gas returning to the decomposition reactor. This possibility involves difficulties in selecting suitable materials of construction for the high temperatures and corrosive gases in this service.

One means of accomplishing this heat exchange could be to utilize a solid heat-transfer system. The upper vessel in such a system would consist of a fluent mass of heat transfer particles which would be heated by the hot gases from the reactor (after removal of product solids). These heated particles would pass downwards by gravity flow through a narrow passage into a second chamber through which the gases to be heated are caused to flow. The heat-transfer solids give up their heat to these gases and are then returned by a mechanical or pneumatic elevator to the upper vessel to be preheated. Such a system would obviate the need for expensive alloy steel heat transfer surfaces since the chambers described could be constructed of refractory-lined carbon steel.

By control of gas velocities in the two chambers of the system described above, an additional advantage could be realized. Even though the exit gases from the reactor are passed through a solids-removal step to recover solid products of the reaction, it is well known that any solids removal system still leaves small quantities of solids in the gaseous stream. The gases could be passed through the heater where they give up their heat to the heat-transfer particles at velocities below that required to convey the product solids through the mass of heat transfer particles. The heater would act as a scrubber for solids and these would pass downward to the lower chamber. In this case, the gases being heated are passed through said lower chamber at velocities large enough to recover these product particles, entraining said particles and returning them to the reactor and solids recovery system.

While the example described above is for aluminum sulfate, any metallic sulfate may be similarly treated with the necessary changes in process variables. For example, iron sulfate may also be decomposed at 1500° F. with the same ratio of recycle gases to sulfur trioxide. Other sulfates may require higher or lower temperatures for their decomposition with corresponding changes in the weight ratios of recycle gas to sulfur trioxide product, but such variations are readily calculable by those skilled in the art.

Having thus described the subject matter of my invention, what it is desired to secure by Letters Patent is:

1. A process for carrying out endothermic chemical decomposition reactions with a particulate, solid reactant which decomposes into solid and gaseous reaction products upon application of substantial quantities of heat in a controlled atmosphere which comprises:

suspending said particulate solid reactant in an upwardly moving gas stream within a closed reaction vessel, said gas stream providing the controlled atmosphere and comprising gases which are reaction products of the solid reactant, heating a mass of discrete inert heat transfer particles in a zone which is isolated from the controlled atmosphere, supplying heat to the solid particulate reactant and the upwardly-moving gas stream by countercurrently passing the heated inert particles with respect to the gas stream and the solid particulate reactants trained therein, the velocity of said gas stream being insufficient to fluidize the downwardly flowing inert heat transfer particles but sufficient to transport the solid reactant upwardly through the reaction vessel, recovering the reaction products in the gas stream in the upper zone of the reaction vessel, and separating the gaseous reaction products from the solid reaction products.

2. The process of claim 1 further characterized in that at least a portion of the gaseous reaction products are recycled to provide said controlled atmosphere.

3. The process as claimed in claim 1, wherein said solid reactant particles are no more than one-fifth (⅕) the size of said heated, inert particles.

4. The process as claimed in claim 1, wherein said gas is a reaction product, a reactant, and is supplied in sufficient quantity to meet the stoichiometric and equilibrium requirements of the desired reaction.

5. Process as claimed in claim 1, wherein said gas velocity ranges between about five and twenty percent (5–20%) less than the critical velocity required to fluidize said inert particles.

6. The process as claimed in claim 1, wherein said inert particles range between about one-quarter and three-quarters of an inch (¼–¾″) in diameter.

7. Process as claimed in claim 1, wherein said solid reactant is a metal sulfate, said gas is sulfur dioxide and said decomposition products are the corresponding metal oxide, sulfur trioxide, and sulfur dioxide.

8. Process as claimed in claim 7, wherein said metal sulfate is aluminum sulfate, said oxide is aluminum oxide and the reaction temperature is at least 1470° F.

9. Process as claimed in claim 8, wherein said aluminum oxide is separated from said sulfur trioxide and sulfur dioxide, said sulfur trioxide is absorbed within concentrated sulfuric acid, and said sulfur dioxide is recycled to said reaction vessel.

References Cited by the Examiner

UNITED STATES PATENTS

| | | | |
|---|---|---|---|
| 1,752,599 | 4/1930 | Kjellgren | 23—142 X |
| 2,376,564 | 5/1945 | Upham et al. | 208—148 |
| 2,582,246 | 1/1952 | Garbo. | |
| 2,773,741 | 12/1956 | Antonsen | 23—142 |
| 2,801,901 | 8/1957 | Dingman et al. | 23—142 |
| 2,830,892 | 4/1958 | Udy | 23—142 X |
| 2,907,644 | 10/1959 | Cunningham et al. | 23—284 |
| 2,915,365 | 12/1959 | Saussol | 23—142 |
| 3,007,774 | 11/1961 | Stokes et al. | 23—143 |
| 3,017,254 | 1/1962 | Evans et al. | 23—284 |

OSCAR R. VERTIZ, *Primary Examiner.*

MAURICE A. BRINDISI, *Examiner.*

H. T. CARTER, *Assistant Examiner.*